No. 813,565. PATENTED FEB. 27, 1906.
C. F. MAROHN.
WHEEL.
APPLICATION FILED SEPT. 30, 1905.
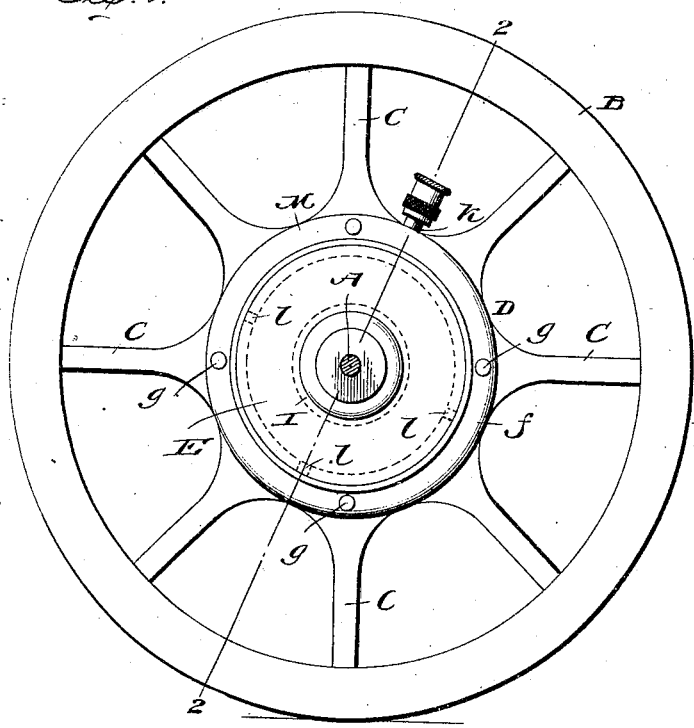
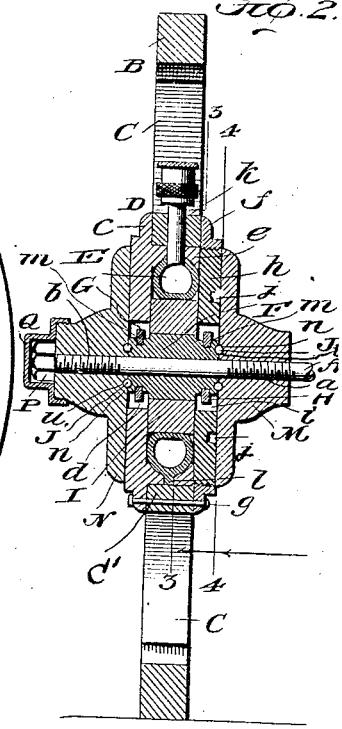
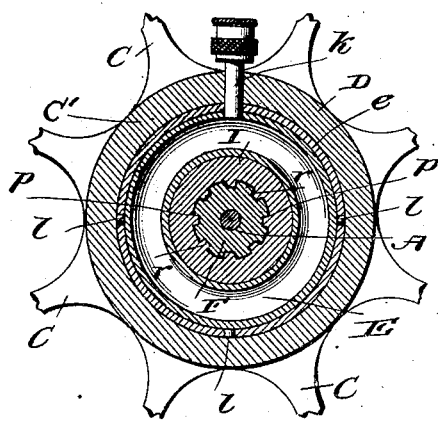

UNITED STATES PATENT OFFICE.

CHARLES F. MAROHN, OF MILWAUKEE, WISCONSIN.

WHEEL.

No. 813,565.  Specification of Letters Patent.  Patented Feb. 27, 1906.

Application filed September 30, 1905. Serial No. 280,821.

*To all whom it may concern:*

Be it known that I, CHARLES F. MAROHN, a citizen of the United States, residing at Milwaukee, in the county of Milwaukee and State of Wisconsin, have invented new and useful Improvements in Wheels, of which the following is a specification.

My invention pertains to vehicle-wheels, more particularly wheels for use in motor-vehicles; and it contemplates the provision of a wheel embodying practical and efficient interior means for taking up shock and jar and preventing the transmission of the same to the occupants of a vehicle.

The invention will be fully understood from the following description and claims when taken in connection with the accompanying drawings, forming part of this specification, in which—

Figure 1 is a side elevation of the wheel constituting the present and preferred embodiment of my invention. Fig. 2 is a diametrical section of the wheel, taken in the plane indicated by the line 2 2 of Fig. 1 and showing the axle, the inflation-tube, and one of the transverse bolts in elevation. Fig. 3 is a detail section taken at right angles to Fig 2 and in the plane indicated by the line 3 3 thereof and also showing the inflation-tube and the spokes in elevation, and Fig. 4 is a similar view taken in the plane indicated by the line 4 4 of Fig. 2.

Similar letters designate corresponding parts in all of the views of the drawings, referring to which—

A is an axle threaded at an intermediate point of its length, as indicated by $a$, and at its end, as indicated by $b$.

B is the rim of my novel wheel.

C C are spokes suitably fixed to and extending inwardly from the rim and corresponding in thickness to said rim, and D is a circular case. The spokes C are preferably formed integral with or fixed to an annular body C', as shown in Figs. 2 and 3. The case D comprises a side plate $c$, having a central circular opening $d$ and also having a lateral circular flange $e$ disposed within and arranged in the same vertical plane as the annular body C' and spokes C, an interiorly-threaded annular plate $f$, disposed at the opposite side of the annular body, and series of spokes with reference to the plate $c$, transverse bolts $g$ extending through the plate $c$, the annular spoke-body C', and the annular plate $f$ and fixing the said elements with respect to each other, and an exteriorly-threaded circular plate $h$ disposed in and engaging the thread of the annular plate $f$ and having a central circular aperture $i$, as shown. Being connected to the annular plate $f$ by screw-threads, the plate $h$ is removable, so as to permit access being readily gained to the interior of the case, and in order that the said plate $h$ may be quickly and easily removed with but a minimum amount of effort I prefer to provide it with sockets $j$ for the engagement of a spanner or the like.

The inner side of the flange $e$ on the side plate $c$ of the case D is rounded or concave in cross-section, as best shown in Fig. 2, so as to better receive a pneumatic tube E. This pneumatic tube E is circular and is provided with an inflation-tube $k$ and two (more or less) teats or peripheral projections $l$. The said inflation-tube $k$ and teats or projections $l$ extend through apertures in the flange $e$ of case D, and the inflation-tube, as its name implies, is designed to serve for the connection of the pump employed to inflate the tube E, while the teats or projections have for their purpose to hold the said tube E against creeping or casual movement in the said case D. The inflation-tube $k$ also extends through the annular body C', Figs. 2 and 3.

F is an axle-box, of steel or the like, designed to snugly receive the axle A. The said box F is provided at points adjacent to its ends with circumferential grooves $m$, and in its ends it has circular grooves $n$, designed to form parts of ball-races, hereinafter described in detail. It is also provided, as best shown in Fig. 3, with exterior longitudinal grooves $p$. The grooves $m$ of the box F are designed to seat rubber rings G and H, which surround and project radially from the box, while the longitudinal grooves $p$ have for their purpose to receive corresponding ribs $r$ on the inner side of an annulus I, of rubber or analogous springy material, so as to hold the said annulus against rotation on the box F. As clearly shown in Fig. 2 of the drawings, the resilient or springy annulus I rests within and against the inner side of the pneumatic tube E, and from this it follows that the said annulus will cushion and prevent injury to the pneumatic tube when a considerable weight is suddenly imposed on said tube and will also by virtue of the frictional contact between it and the tube assist in holding the said tube against creeping in the case D. It will further be apparent that by reason of its resilient or springy nature the annulus I will assist the pneumatic tube materially in preventing the transmission of shock and jar from the wheel to the axle A, as will be hereinafter more fully pointed out.

By reference to Fig. 2 of the drawings it will be noticed that the rubber rings G and H on the box F are disposed in the same vertical planes as the side plates $c$ and $h$ of the casing D. By virtue of this it will be apparent that while under ordinary conditions of usage the plates $c$ and $h$ will not contact with the resilient rings G and H, yet when an extraordinary weight is suddenly imposed on the axle A the said resilient rings G and H will be carried against the walls of the central apertures in the plates $c$ and $h$. It will also be appreciated that by bearing on the plates $c$ and $h$ in the manner stated the resilient rings G and H will effectually prevent undue compression of the pneumatic tube E, and thereby materially lessen the liability of the said tube exploding or being injured beyond repair while in use.

Mounted on the axle A and engaging the thread $a$ thereof is a disk M. This disk M, which is held by the threads or any other suitable means against rotation on the axle A, is provided with a flat inner side opposed to the plate $h$ of the wheel and is also provided in said side with a circular groove $t$. This groove $t$, in combination with one of the grooves $n$ of the box F, forms a race in which antifriction-balls J are arranged and adapted to move, said balls having for their function to eliminate friction between one end of the box F and the disk M.

N is an interiorly-threaded disk screwed on the threaded end $b$ of axle A, and thereby fixed to the axle. P is a nut screwed on said threaded end $b$ of the axle outside the disk N, and Q is a dust-cap, which is preferably, though not necessarily, employed. The disk N is provided with a flat inner side opposed to the plate $c$ of the case D in the wheel, and it is also provided in said side with a circular groove $u$, which, in combination with the outer groove $n$ of box F, forms a race in which antifriction-balls J' are arranged and adapted to move.

In the practical use of my novel wheel it will be observed that the wheel as a whole will turn freely and with but a minimum amount of friction on the axle A and between the disks M and N. It will also be observed that the pneumatic tube E, coöperating with the annulus I, will effectually prevent the transmission of shock and jar from the wheel to the axle A, and this notwithstanding the fact that the said tube and annulus are inclosed in the wheel, where they are protected against injury and from the weather. It will further be observed that in cushioning the wheel and preventing the transmission of shock and jar from the wheel to the axle the tube E and the annulus I prevent injury to the wheel and materially prolong the usefulness of the same.

When my novel wheel is removed from the axle and it is desired to gain access to the interior of the case D for any purpose, the same may be readily accomplished by simply removing the plate $h$.

While I have shown my novel wheel as merely having a rim, it is obvious that a pneumatic cushion or other suitable tire may be provided on the said rim without involving a departure from the spirit of my invention. It will be remembered, however, that my improvements render the employment of a pneumatic or other cushioning tire on the rim unnecessary.

The embodiment of my invention herein illustrated and described is designed to turn on an axle rather than with the axle; but it is obvious that by resorting to expedients well known in the art my improved wheel may be connected to the axle so as to turn therewith.

Having described my invention, what I claim, and desire to secure by Letters Patent, is—

1. In a wheel, the combination of a wheel-body, a box adapted to receive an axle, a pneumatic tube surrounding the box and resting against the wheel-body, an annulus, of resilient or springy material interposed between the box and the pneumatic tube, and rings of cushioning material disposed at opposite sides of the annulus and surrounding and extending radially from the box; the wheel-body and the said rings of cushioning material being so relatively arranged that the latter do not bear on the former except when undue weight is imposed on the box.

2. A wheel comprising a body containing a case having side walls provided with central, circular openings, a box arranged in the case and having rings of resilient material extending beyond its outer side and arranged in the same planes as the side walls of the case and loosely occupying the openings in said side walls, an inflatable tube surrounding the box and arranged in and against the case, and an annulus of resilient or springy material surrounding the box and interposed between the same and the inflatable tube.

3. A wheel comprising a body containing a case having side walls in which are central, circular openings and also having a circular wall and apertures therein, a box arranged in the case and having rings of resilient material extending beyond its outer side and arranged in the same planes as the side walls of the case and loosely occupying the openings in said side walls, an inflatable tube surrounding the box and arranged in and against the case and having teats disposed in the apertures in the circular wall thereof, in combination with an axle occupying the box and having threaded portions, threaded disks mounted on the threaded portions of the axle and disposed at opposite sides of the case of the wheel, and antifriction-balls interposed between said disks and the ends of the box.

4. A wheel comprising a body containing a case, a box arranged in the case, an inflatable tube surrounding the box and arranged in and against the case, and an annulus of resilient or springy material surrounding the box and interposed between the same and the inflatable tube; in combination with an axle occupying the box, and disks fixed on the axle at opposite sides of the case of the wheel.

5. A wheel comprising a body containing a case having side walls provided with central, circular openings, a box arranged in the case and having rings of resilient material extending beyond its outer side and arranged in the same planes as the side walls of the case and loosely occupying the openings in said side walls, an inflatable tube surrounding the box and arranged in and against the case, and an annulus of resilient or springy material surrounding and held to the box and interposed between the same and the inflatable tube; in combination with an axle occupying the box, and disks fixed on the axle at opposite sides of the case of the wheel.

In testimony whereof I have hereunto set my hand in presence of two subscribing witnesses.

CHARLES F. MAROHN.

Witnesses:
  Wm. C. Darling,
  Nellie C. Healy.